United States Patent [19]
Hamaguchi et al.

[11] Patent Number: 5,643,409
[45] Date of Patent: Jul. 1, 1997

[54] METHOD FOR DEINKING WASTEPAPER

[75] Inventors: Koji Hamaguchi; Yoichi Ishibashi; Hideaki Urushibata, all of Wakayama, Japan

[73] Assignee: Kao Corporation, Tokyo, Japan

[21] Appl. No.: 313,887

[22] Filed: Sep. 28, 1994

Related U.S. Application Data

[62] Division of Ser. No. 861,435, Apr. 1, 1992, abandoned.

[30] Foreign Application Priority Data

| Apr. 5, 1991 | [JP] | Japan | 3-73048 |
| Apr. 5, 1991 | [JP] | Japan | 3-73049 |

[51] Int. Cl.$^6$ .................................................. D21E 5/02
[52] U.S. Cl. .................. 162/5; 162/4; 162/56; 162/72; 510/174; 510/421; 252/60
[58] Field of Search ................ 162/4, 5, 7, 72, 162/75, 77, 56; 106/243; 252/174.21, 174.22, DIG. 1, 60; 510/174, 421

[56] References Cited

U.S. PATENT DOCUMENTS

| 3,098,784 | 7/1963 | Gorman, Jr. | 162/5 |
| 3,932,206 | 1/1976 | Illinworth et al. | 162/5 |
| 4,599,190 | 7/1986 | Maloney | 252/174.24 |
| 4,618,400 | 10/1986 | Wood et al. | 162/5 |
| 4,648,987 | 3/1987 | Smith et al. | 252/559 |
| 4,737,314 | 4/1988 | Yokoyama et al. | 252/551 |
| 4,780,179 | 10/1988 | Clement | 162/5 |
| 4,964,949 | 10/1990 | Hamaguchi et al. | 162/5 |
| 5,102,500 | 4/1992 | Darlington | 162/5 |
| 5,120,397 | 6/1992 | Urushibata et al. | 162/5 |
| 5,158,697 | 10/1992 | Kawamori et al. | 252/60 |
| 5,241,042 | 8/1993 | Petrea et al. | 524/377 |
| 5,282,928 | 2/1994 | Takahashi et al. | 162/5 |
| 5,288,369 | 2/1994 | Ishibashi | 162/5 |
| 5,288,416 | 2/1994 | Petrea et al. | 252/86 |
| 5,290,479 | 3/1994 | Clark | 252/351 |

FOREIGN PATENT DOCUMENTS

| 241224 | 10/1987 | European Pat. Off. . |
| 307024 | 3/1989 | European Pat. Off. ........ C09D 9/04 |
| 434084 | 6/1991 | European Pat. Off. . |
| 109696 | 12/1981 | Japan . |
| 58-109696 | 6/1983 | Japan . |
| 243892 | 4/1986 | Japan . |
| 165591 | 12/1986 | Japan . |
| 182488 | 1/1987 | Japan . |
| 63-182489 | 1/1987 | Japan . |
| 575531 | 2/1946 | United Kingdom . |
| 2231595 | 11/1990 | United Kingdom . |

OTHER PUBLICATIONS

English Language Abstract of Japanese Patent No. 52–81107 dated Jul. 7, 1977.

English Language Abstract of Japanese Patent No. 1–40609 dated Feb. 10, 1989.

English Language Abstract of Japanese Patent No. 59–137588 dated Aug. 7, 1984.

English Language Abstract of Japanese Patent No. 56–79795 dated Jun. 30, 1981.

English Language Abstract of Japanese Patent No. 55–51892 dated Apr. 15, 1980.

English Language Abstract of Japanese Patent No. 55–51891 dated Apr. 15, 1980.

World Patents Index, Week 8824, Derwent Publications, London (AN 86–147920 & JP A–61083388), 26 Apr. 1986, Abstract.

*Primary Examiner*—Donald E. Czaja
*Assistant Examiner*—Jose S. Fortuna

[57] ABSTRACT

A deinking method which comprises adding a specified nonionic surfactant having a specified solubility parameter as an essential component, during in the pulping step (the preceding step) and in any of the subsequent steps (the succeeding step). By use of the deinking surfactant composition and the deinking method of the present invention, an excellent deinking performance, including an elevated whiteness, a decrease in the number of unliberated large ink spots and an improved defoaming property of the flotation reject, can be achieved in deinking waste papers, in particular, waste OA papers and blends containing thereof.

11 Claims, No Drawings

METHOD FOR DEINKING WASTEPAPER

This application is a divisional of application Ser. No. 07/861,435, filed on Apr. 1, 1992, the entire contents of which are hereby incorporated by reference now abandoned.

BACKGROUND OF THE INVENTION

1. Field of the Invention

The present invention relates to a deinking composition and a deinking method for use in the reclamation of waste paper including newspapers, magazines and waste office automation (OA) papers. More particularly, the present invention relates to a deinking composition and a deinking method whereby a deinked pulp can be obtained that has a high whiteness and a high b value with little contamination from unliberated ink spots, particularly unliberated large ink spots having a particle size of 30 μm or more. The deinked pulp can be obtained from, for example, newspapers, magazines or waste OA papers by flotation, washing or a combination procedure thereof.

2. Description of the Related Art

It has been a practice to reclaim waste papers including newspapers, magazines and waste OA papers. Recently the effective utilization of waste papers has become more and more important in conjunction with the problems of the global environment such as the conservation of forest resources and refuse disposal. Further, it has been attempted to utilize deinked pulp as a pulp of a higher rank, for example, to reclaim old newspapers for use in making a paper of intermediate grade.

On the other hand, recent improvements in printing techniques, printing systems and printing ink compositions have made it difficult to deink waste papers. In order to facilitate deinking, therefore, attempts have been made to improve deinking devices.

Meanwhile, conventional deinking compositions are as follows. In order to remove inks and other impurities from waste paper, there have been used alkaline agents such as caustic soda, sodium silicate, sodium carbonate and sodium phosphate, bleaching agents such as hydrogen peroxide, hydrosulfites and hypochlorites, and sequestering agents such as EDTA and DTPA together with one or more deinking agents. The deinking agents include anionic surfactants such as alkylbenzenesulfonates, higher alcohol sulfates, α-olefinsulfonates and dialkyl sulfosuccinates, nonionic surfactants such as ethylene oxide adducts of higher alcohols, alkylphenols and fatty acids and alkanolamides. Although these deinking compositions show excellent foaming properties in the flotation step, their ability to collect ink are limited. In the washing step, on the other hand, they are poor in detergency and, furthermore, their good foaming properties cause trouble in the effluent disposal step. As a result, only a deinked pulp of a low grade can be obtained by these methods. In order to deink waste OA papers including plain paper copy (PPC) and computer print output (CPO), in particular, it is required to either apply a large shear force energy or use a large amount of alkalis, since printing inks (toners) used therein comprise styrene/acrylic binders or polyester binders, which differ from the conventional newspaper ink, result in large ink spots (i.e., a particle size of 30 μm or more) remaining unliberated after the completion of a common deinking treatment. However, the use of a large amount of alkalis suffers from some disadvantages, including an increase in the sticky matters, the load in the effluent disposal step and the brittleness of the pulp. Thus no method for effectively deinking waste OA papers and blends thereof has been established so far.

DESCRIPTION OF THE INVENTION

Summary of the Invention

The present inventors have conducted extensive studies in order to develop a deinking composition and a deinking method showing a good deinking performance without any foaming troubles whereby a deinked pulp of a high whiteness can be obtained from various waste papers and, in particular, large ink spots having a particle size of 30 μm or more can be removed from waste OA papers and blends containing thereof while requiring neither a large shearing energy nor a large amount of alkalis in the flotation, washing or combination procedure thereof. As a result, they have surprisingly found out that the aforesaid problems can be solved by using a deinking composition containing a specified nonionic surfactant deinking agent as an essential component and a method wherein said deinking composition is added in the pulping step and in one or more the subsequent steps, thus completing the present invention.

Accordingly, the present invention provides a deinking composition comprising a deinking agent selected from the group consisting of;

(I) a reaction product mixture having a solubility parameter of 8.9 to 10.2, which obtained from (a) a polyfunctional alcohol having 1 to 10 carbon atoms and/or (b) a polyfunctional fatty acid having 1 to 10 carbon atoms and (c) an alkylene oxide, said reaction product mixture including therein 1 to 4 moles of alkylene oxide units per 1 functional group of (a) or (b), including 22 moles or less of alkylene oxide units in total of one molecule of the product, (II) a partial ester mixture having a solubility parameter of 8.9 to 9.8, which formed by reacting a reaction product mixture which obtained from (a) a polyfunctional alcohol having 1 to 10 carbon atoms and/or (b) a polyfunctional fatty acid having 1 to 10 carbon atoms and (c) an alkylene oxide, said reaction product mixture including therein 1 to 4 moles of alkylene oxide units per 1 functional group of (a) or (b), including 22 moles or less of alkylene oxide units in total of one molecule of the product, with (d) a fatty acid having 2 to 8 carbon atoms, and (III) an alkylene oxide adduct compound mixture having a solubility parameter of 9.0 to 11.8, said alkylene oxide adduct compound mixture comprising or essentially consisting compounds represented by the following general formula (1):

$$RO(AO)_mH \qquad (1)$$

wherein

R represents an alkyl, alkenyl, acyl or aryl group having 1 to 8 carbon atoms;

AO represents an alkylene oxide having 2 to 4 carbon atoms; and m is a value such that the entire alkylene oxide adduct compound mixture has the average mole number of AO units ranging from 1 to 6.

The present invention further provides a method for deinking waste paper, comprising;

(I) pulping the waste paper, (II) subjecting the pulp to at least one treatment step selected from the group consisting of kneading, dispersing, chemical mixing and refining, and (III) subjecting the treated pulp to a flotation or washing step, wherein the above-described deinking composition is added in portions in steps (I) and (II) and/or (III).

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The reaction product mixture (I) to be used as a deinking agent in the present invention may be obtained from (a) a polyfunctional alcohol having 1 to 10 carbon atoms and/or (b) a polyfunctional fatty acid having 1 to 10 carbon atoms and (c) an alkylene oxide, that is, by adding (c) an alkylene oxide to (a) a polyfunctional alcohol having 1 to 10 carbon atoms and/or (b) a polyfunctional fatty acid having 1 to 10 carbon atoms by any known method. The obtained reaction product mixture includes 1 to 4 moles, on average, of alkylene oxide units per 1 functional group of (a) or (b), and 22 moles or less, on average, of alkylene oxide units in total of one molecule of the product. The present invention includes a deinking agent comprising a compound obtained by adding from 1 to 4 mol per functional group of an alkylene oxide to a polyfunctional alcohol or a polyfunctional fatty acid having 1 to 10 carbon atoms, provided that the total addition mole number does not exceed 22 mol, and having a solubility parameter ranging from 8.9 to 10.2 as an essential component.

The term "polyfunctional" as used herein means "having two or more functional groups carrying active hydrogen."

Specific examples of (a) the polyfunctional alcohol having 1 to 10 carbon atoms usable as the starting material include ethylene glycol, trimethylene glycol, 1,4-butanediol, 1,5-pentanediol, 1,6-hexanediol, 1,7-heptanediol, 1,8-octanediol, 1,9-nonanediol, 1,10-decanediol, 1,2-octanediol, 1,2-decanediol, butanoyl-α-glycol, 1,3-butanediol, trans-2-butene-1,4-diol, 2-butyne-1,4-diol, 2,4-pentanediol, 2,5-hexanediol, 2-methyl-1,3-pentanediol, 2-methyl-2,4-pentanediol, 2,3-dimethyl-2,3-butanediol, 2,4-heptanediol, 2,2-diethyl-1,3-propanediol, 2-ethyl-1,3-hexanediol, 2-ethyl-2-butyl-1,3-propanediol, diethylene glycol, triethylene glycol, tetraethylene glycol, dipropylene glycol, 1,2-cyclononanediol, 1,2-cyclodecanediol, glycerol, erythritol, pentaerythritol, arabitol, sorbitol, sorbitan, mannitol, mannitan, 1,2,3-butanetriol, 2-methylpropane-1,2,3-triol, 2,3,4-pentanetriol, 2-methylbutane-1,2,3-triol, 2,3,4-hexanetriol, 2-ethylbutane-1,2,3-triol, 2,3,4-trimethylpentane-2,3,4-triol, D-glycero-D-galaheptose, D-glycero-D-glucoheptose, D-glycero-D-mannoheptose, D-glycero-L-mannoheptose, D-glycero-D-galaheptitol, D-altroheptulose, D-altro-3-heptulose, D-mannoheptulose, D-erythro-D-galaoctitol, D-glycero-D-mannooctulose, D-erythro-L-gulononulose, cellobiose, maltose and lactose.

Among these compounds, polyfunctional alcohols having 1 to 6 carbon atoms are particularly preferable. It is further preferable to use saturated polyfunctional alcohols having 1 to 3 carbon atoms.

Examples of (b) the polyfunctional fatty acid having 1 to 10 carbon atoms usable as the starting material include oxalic acid, malonic acid, succinic acid, glutaric acid, adipic acid, pimelic acid, suberic acid, azelaic acid, sebacic acid, ethylmalonic acid, 2-hydroxyvaleric acid, 2-hydroxycaproic acid, 2-hydroxycaprylic acid, 2-hydroxypelargonic acid, 2-hydroxyundecanoic acid, 3-hydroxycaprylic acid, 3-hydroxypelargonic acid, 3-hydroxycapric acid, 6-hydroxycaproic acid, 7-hydroxyenanthic acid, 8-hydroxycaprylic acid, 9-hydroxypelargonic acid, 10-hydroxycapric acid, 2-methylhydroxyenanthic acid, 2-hydroxy-3-pentenoic acid, 5-hydroxy-2,4-pentadienoic acid, 2,3-dihydroxycaproic acid, 2,3-dihydroxyenanthic acid, 2,3-dihydroxycaprylic acid, 2,3-dihydroxypelargonic acid, 2,3-dihydroxycapric acid, 1-nonene-1,9-dicarboxylic acid, 2-nonene-1,9-dicarboxylic acid, 1-decene-1,10-dicarboxylic acid and 2-decene-1,10-dicarboxylic acid.

Among these compounds, polyfunctional fatty acids having 1 to 6 carbon atoms are particularly preferable. It is further preferable to use saturated polyfunctional fatty acids having 1 to 3 carbon atoms.

As (c) the alkylene oxide to be added to (a) the polyfunctional alcohol and (b) the polyfunctional fatty acid, ethylene oxide (hereinafter referred to simply as EO), propylene oxide (hereinafter referred to simply as PO) and butylene oxide (hereinafter referred to simply as BO) may be used either alone or as a mixture thereof. It is particularly preferable to use EO, PO or a mixture thereof. Although (c) the alkylene oxide may be added by either random addition or block addition, the random addition is preferable when taking foaming troubles in the papermaking and effluent disposal steps into consideration.

For producing the above-described reaction product mixture (I), the addition of (c) the alkylene oxide may be effected by any common method without restriction. Namely, it may be carried out under the conditions commonly employed for adding an alkylene oxide to a compound having active hydrogen. Specifically, it may be performed by adding a catalytic amount of an alkali to (a) the polyfunctional alcohol and/or (b) the polyfunctional fatty acid according to the present invention and then reacting (a) the polyfunctional alcohol and/or (b) the polyfunctional fatty acid with (c) the alkylene oxide at a temperature of approximately 100° to 200° C. under a pressure of 1 to 3 kg/cm² (gauge) for several hours.

The partial ester mixture (II) to be used as a deinking agent in the present invention is a partial ester of the aforesaid reaction product mixture (I) with (d) a fatty acid having 2 to 8 carbon atoms.

Namely, the present invention includes a deinking agent comprising a compound which is a partial ester of a compound obtained by adding from 1 to 4 mol per functional group of an alkylene oxide to a polyfunctional alcohol or a polyfunctional fatty acid having 1 to 10 carbon atoms, provided that the total addition mole number does not exceed 22 mol, with a fatty acid having 2 to 8 carbon atoms and has a solubility parameter ranging from 8.9 to 9.8 as an essential component.

Examples of (d) the fatty acid having 2 to 8 carbon atoms to be used for producing the aforesaid partial ester include acetic acid, propionic acid, propynoic acid, butyric acid, isobutyric acid, tetrolic acid, valerio acid, α-methylbutyric acid, isovaleric acid, trimethylpropanoic acid, 2-pentynoic acid, allylacetic acid, 2,4-pentadienoic acid, caproic acid, 2-methylpentanoic acid, 3-methylpentanoic acid, 4-isocaproic acid, 2-hexynoic acid, sorbic acid, 2-hexenoic acid, 3-hexenoic acid, 4-hexynoic acid, 5-hexenoic acid, heptanoic acid, 2-heptenoic acid, 3-heptenoic acid, 5-heptenoic acid, 6-heptenoic acid, 2-heptynoic acid, 6-heptynoic acid, caprylic acid, 2-ethylhexanoic acid, 2-octenoic acid, 3-octenoic acid, 2-octynoic acid, 7-octynoic acid, 2-methyl-2-heptenoic acid, benzoic acid, methylbenzoic acid, cyclohexylacetic acid, 2-fluorovaleric acid, 2-fluorocaproic acid, 2-fluoroenanthic acid, 2-chlorocaprylic acid, 2-bromovaleric acid, 2-bromocaproic acid, 2-bromoenanthic acid, 2-bromocaprylic acid, 5-chlorovaleric acid, oxalic acid, malonic acid, succinic acid, glutaric acid, adipic acid, pimelic acid, suberic acid, ethylmalonic acid, 2-hydroxyvaleric acid, 2-hydroxycaproic acid, 2-hydroxycaprylic acid, 2-hydroxypelargonic acid, 2-hydroxyundecanoic acid, 3-hydroxycaprylic acid, 6-hydroxycaproic acid, 7-hydroxyenanthic acid, 8-hydroxycaprylic acid, 2-methyl-hydroxyenanthic acid, 2-hydroxy-3-pentenoic acid, 4-hydroxy-3-pentenoic acid, 4-hydroxy-4-pentenoic acid, 5-hydroxy-2,4-pentadienoic acid, 2,3-dihydroxycaproic acid, 2,3-dihydroxyenanthic acid, 2,3-dihydroxycaprylic acid and anhydrides of these acids. It is particularly preferable to use fatty acids having 2 to 4 carbon atoms, still preferably saturated ones.

Since the numerical values specified with respect to the carbon atom number and physicochemical constants of the reaction product mixture (I) and the partial ester mixture (II) are critical ones, any compound similar thereto cannot exert the remarkable effects of the present invention. As will be apparent from the Examples to be given hereinafter, when (a) the polyfunctional alcohol or (b) polyfunctional fatty acid has more than 10 carbon atoms, for example, foaming troubles occur in the draining step, due to the high foaming properties, and thus the productivity of the deinked pulp is seriously deteriorated. Further, it is important that the addition of the alkylene oxide per functional group fall within the range of from 1 to 4, provided that the total addition of alkylene oxide does not exceed 22 mole per one molecule in (I) and (II). When the addition of the alkylene oxide, per functional group, is smaller than 1, a number of large ink spots, that is spots having a particle size of 30 µm or more, will remain unliberated. When it exceeds 4, on the contrary, the high foaming properties often cause foaming troubles in the effluent disposal step. When the total addition of the alkylene oxide exceed 22 mole, the above-mentioned foaming troubles occur frequently.

When (d) the fatty acid used in the esterification to produce the partial ester mixture (II) has less than 2 carbon atoms, the number of the remaining unliberated large ink spots is elevated. When (d) the fatty acid has more than 8 carbon atoms, on the contrary, the high foaming properties often cause foaming troubles in the effluent disposal step.

Furthermore, the degree of esterification of the partial ester mixture (II), should range from 15 to 75% by mole. When it is smaller than 15% by mole, a large amount of the large ink spots which have a particle size of 30 µm or more, will remain unliberated. This restricts the utilization of the deinked pulp (for example, decreases the amount of its incorporation under the top side of board). When the degree of esterification exceeds 75% by mole, on the contrary, the ink particles become excessively fine, which makes it difficult to obtain a deinked pulp of a high whiteness.

The present inventors have tried to further improve the deinking performance of waste OA papers and blends containing waste OA papers. As a result, they have surprisingly found that a mixture having a solubility parameter in a specified range can efficiently lower the number of unliberated large ink spots having a particle size of 30 µm or more.

It is important that the solubility parameter of the reaction product mixture (I) range from 8.9 to 10.2, preferably from 9.1 to 10.0 and still preferably from 9.4 to 9.8, and the solubility parameter of the partial ester mixture (II) ranges from 8.9 to 9.8, preferably from 9.1 to 9.7 and still preferably from 9.2 to 9.5. When the solubility parameter is smaller than the lower limit as specified above, the obtained deinked pulp is contaminated with many unliberated large ink spots. When it exceeds the upper limit, on the contrary, ink particles become excessively small and thus cannot be sufficiently removed in the flotation step. As a result, the obtained deinked pulp has low whiteness. Additionally, problems including poor defoaming properties of the flotation reject and foaming troubles in the effluent disposal step, are likely to occur.

The term "solubility parameter" as used herein means a physicochemical constant that is defined based on the regular solution theory established by Hildebrand.

Whether two substances are mutually soluble or not is determined by the free energy of mixing, ΔG, as defined by the following formula:

$$\Delta G = \Delta H - T\Delta S$$

When the ΔG value is negative, these substances are soluble. This ΔG is expressed as a function of the solubility parameter. From the viewpoint of the regular solution theory, the molar free energy of mixing, ΔG, is given by the following formula:

$$\Delta G = RT(X_1 \ln X_1 + X_2 \ln X_2) + V_1 X_1 \phi_2^2 (\delta_1 - \delta_2)^2 + V_2 X_2 \phi_1^2 (\delta_1 - \delta_2)^2$$

wherein $X_1$ and $X_2$ represent the molar fractions of components 1 and 2, respectively;

$V_1$ and $V_2$ represent the molar volume of components 1 and 2, respectively;

$\phi_1$ and $\phi_2$ represent the volume fraction of components 1 and 2, respectively; and $\delta_1$ and $\delta_2$ represent the solubility parameter of components 1 and 2, respectively.

The alkylene oxide adduct compound mixture (III) to be used as a deinking agent in the present invention is a mixture comprising or essentially consisting compounds represented by the following general formula (1):

$$RO(AO)_m H \qquad (1)$$

wherein

R represents an alkyl, alkenyl, acyl or aryl group having 1 to 8 carbon atoms;

AO represents an alkylene oxide having 2 to 4 carbon atoms; and m is a value such that the entire alkylene oxide adduct compound mixture has the average mole number of AO units ranging from 1 to 6.

Namely, the present invention includes a deinking agent comprising a compound represented by the following general formula (1):

$$RO(AO)_m H \qquad (1)$$

wherein

R represents an alkyl, alkenyl, acyl or aryl group having 1 to 8 carbon atoms;

AO represents an alkylene oxide having 2 to 4 carbon atoms; and m ranges from 1 to 6 on average.

The alkylene oxide adduct compound mixture (III) can be obtained by adding an alkylene oxide(s) to an alcohol(s) and/or a fatty acid(s) having 1 to 8 carbon atoms by any known method.

Examples of the alcohol having 1 to 8 carbon atoms usable as the starting material for producing the alkylene oxide adduct compound mixture (III) include methyl alcohol, ethyl alcohol, n-propyl alcohol, isopropyl alcohol, butyl alcohol, trimethylpropyl alcohol, 1-hexanol, 2-hexanol, 2-hexen-1-ol, 5-hexen-1-ol, 1-heptanol, 2-heptanol, 2-hepten-1-ol, 6-hepten-1-ol, 1-octanol, 2-octanol, 2-octen-1-ol, 2-ethylhexanol, benzyl alcohol, phenol and cyclohexyl alcohol.

Examples of the fatty acid usable as the starting material for producing the alkylene oxide adduct compound mixture (III) include acetic acid, propinoic acid, propyonoic acid, butyric acid, isobutyric acid, tetrolic acid, n-valeric acid, α-methylbutyric acid, isovaleric acid, trimethylpropanoic acid, 2-pentynoic acid, allylacetic acid, 2,4-pentadienoic acid, caproic acid, 2-methylpentanoic acid, 3-methylpentanoic acid, 4-isocaproic acid, 2-hexynoic acid, sorbic acid, 2-hexenoic acid, 3-hexenoic acid, 4-hexenoic acid, 5-hexenoic acid, heptanoic acid, 2-heptenoic acid, 3-heptenoic acid, 5-heptenoic acid, 6-heptenoic acid, 2-heptynoic acid, 6-heptynoic acid, caprylic acid, 2-ethylhexanoic acid, 2-octenoic acid, 3-octenoic acid, 2-octynoic acid, 7-octynoic acid, 2-methyl-2-heptenoic acid, benzoic acid, methylbenzoic acid, cyclohexylacetic acid, 2-fluorovaleric acid, 2-fluorocaproic acid, 2-fluoroenanthic acid, 2-fluorocaprylic acid, 2-chlorocaproic acid, 2-chloroenanthic acid, 2-chlorocaprylic acid, 2-bromovaleric acid, 2-bromocaproic acid, 2-bromoenanthic acid, 2-bromocaprylic acid and 5-chlorovaleric acid.

R of general formula (1) represents preferably a group having 1 to 6 carbon atoms, more preferably an alkyl or an acyl group having 1 to 6 carbon atoms.

As the alkylene oxide to be added to the alcohol or fatty acid usable as the starting material for producing the alkylene oxide adduct compound mixture (III), EO, PO and BO may be used either alone or as a mixture thereof. It is particularly preferable to use EO, PO or a mixture thereof. Although the alkylene oxide may be added by either random addition or block addition, the random addition is preferable by taking foaming troubles in the papermaking and effluent disposal steps into consideration.

For producing the alkylene oxide adduct compound mixture (III), the addition of the alkylene oxide may be effected by any common method without restriction. Namely, it may be carried out under the conditions commonly employed for adding an alkylene oxide to a compound having active hydrogen. Specifically, it may be performed by adding a catalytic amount of an alkali to the alcohol or fatty acid and then reacting the alcohol or fatty acid with the alkylene oxide at a temperature of approximately 100° to 200° C. under a pressure of 1 to 3 kg/cm² (gauge) for several hours.

The present inventors have examined the relationship in the deinking performance between deinking various waste papers and deinking agents having various chemical structures and solubility parameters. As a result, they have surprisingly found that a mixture having a solubility parameter falling within a specified range and comprising compounds which have a specified chemical structure is effective in reducing the number of unliberated large ink spots (i.e., a particle size of 30 µm or more).

Since the numerical values specified with respect to general formula (1) and the solubility parameter of the alkylene oxide adduct compound mixture (III) are critical ones, a merely similar compound cannot achieve the remarkable effects of the present invention. Therefore the specification of the carbon atom in general formula (1) and the physicochemical constants of the alkylene oxide adduct compound mixture (III) are very important. As will be apparent from the Examples to be given hereinafter, when R in general formula (1) represents a group having less than 1 carbon atom (i.e., neither an alkyl group nor an alkenyl group), the compound shows a poor ability to collect ink and thus deinked pulp of a high whiteness can not be obtained. When said carbon atom number exceeds 8, on the contrary, the high foaming properties cause foaming troubles in the effluent disposal step, thus seriously deteriorating the productivity of the deinked pulp. The addition mole number (m) of the alkylene oxide ranges from 1 to 6, preferably from 1 to 4, on average. When it is smaller than 1, many large ink spots having a particle size of 30 µm or more remain unliberated. When it exceeds 6, on the contrary, the high foaming properties frequently cause foaming troubles in the effluent disposal step.

It is important that the solubility parameter of the alkylene oxide adduct compound mixture (III) ranges from 9.0 to 11.8, preferably from 9.5 to 11.3 and more preferably from 9.8 to 10.8. When the solubility parameter is smaller than 9.0, the obtained deinked pulp is contaminated with many unliberated large ink spots. When it exceeds 11.8, on the contrary, ink particles become excessively small and thus cannot be sufficiently removed in the flotation step. As a result, the obtained deinked pulp has only a low whiteness. Additionally, some problems, including a poor defoaming property of the flotation reject and foaming troubles in the effluent disposal step, might occur.

As an essential component of a deinking composition of the present invention, the use of a deinking agent, the numerical values of which fall within the ranges specified in the present invention, makes it possible to obtain a deinked pulp of excellent qualities, i.e., having a high whiteness and scarcely contaminated with unliberated large ink spots (i.e., a particle size of 30 µm or more) without incurring any trouble in the operation.

The compounds disclosed in the prior arts (Japanese Patent Laid-Open No. 81107/1977, No. 51891/1980, No. 51892/1980, No. 79795/1981 and No. 109696/1983) are not as effective as the present deinking agents in reducing the number of unliberated large ink spots. Although the carbon atom number and alkylene oxide addition mole number are specified in the above-mentioned references, most of the starting materials used in the Examples therein have 12 or more carbon atoms and no particular example shows a compound having 11 or less carbon atoms. Further, although Japanese Patent Laid-Open No. 137588/1984 and 40690/1989 disclose alkylene oxide adducts of special polyfunctional alcohols, all of these compounds either have an aryl group or are themselves aromatic compounds. Clearly these compounds differ from the compounds used in the present invention. Furthermore, while Japanese Patent Laid-Open No. 266292/1989 points out that an ether surfactant is effective as a deinking agent for waste OA papers, this compound, wherein the AO moiety of the general formula (1) of the present invention is ethylene oxide and the terminal group of the general formula (1) is replaced by an alkyl or alkenyl group having 1 to 18 carbon atoms, is clearly different in chemical structure from the compound used in the present invention.

In addition, the conventional deinking agents are employed for deinking newspapers and magazines, while the present invention is characterized by being particularly effective in deinking waste OA papers and blends thereof. Printing inks for newspapers contain phenol resins as the ink binder. On the other hand, inks used in waste OA papers contain styrene/acrylic resin or polyester resin as the binder. Thus these inks differ from each other in physicochemical properties. It is therefore required to design a deinking agent and a deinking composition for waste OA papers from a different point of view than that used for waste newspaper deinking compositions. The present invention has been completed based on the fact that a mixture having a solubility parameter within a strictly limited range is effective in deinking, as the result of extensive examination on the solubility parameter which has not been studied hitherto. Thus the present invention clearly differs from prior art.

The deinking agent according to the present invention can also exert the excellent deinking performance when used together with other known deinking agent(s). Namely, the deinking composition of the present invention preferably contains the deinking agent according to the present invention and other known deinking agent(s), or, the deinking composition of the present invention preferably uses together with other deinking composition comprising other known deinking agent(s). The other known deinking agent includes, for example, higher alcohol sulfates, alkylbenzenesulfonates, ethylene oxide adducts of higher alcohols and alkylphenols, fatty acids and salts thereof, alkylene oxide adducts of fatty acids and alkylene oxide adducts of fats and oils. The deinking agent according to the present invention and the known one may be used at a weight ratio of from 90/10 to 10/90, preferably from 20/80 to 60/40.

In the conventional deinking method, a deinking composition is added in either one or both of the mixing step, which consists of the pulping, kneading, dispersing, chemical mixing and refining steps, and the flotation step.

In contrast, the deinking method of the present invention comprises adding the deinking composition according to the present invention during the pulping step (the preceding step) and in one or more of the subsequent steps (the succeeding step) of the mixing step.

Namely, the present invention provides a method for deinking waste paper, comprising;
(I) pulping the waste paper,
(II) subjecting the pulp to at least one treatment step selected from the group consisting of kneading, dispersing, chemical mixing and refining, and
(III) subjecting the treated pulp to a flotation or washing step,
wherein the deinking composition according to the present invention is added in portions in steps (I) and, (II) and/or (III).

The present invention further provides a method for deinking waste paper, comprising;
(I) pulping the waste paper,
(II) subjecting the pulp to at least one treatment step selected from the group consisting of kneading, dispersing, chemical mixing and refining, and
(III) subjecting the treated pulp to a flotation or washing step,
wherein the deinking composition according to the present invention is added during steps (I) and (II).

The deinking composition may be preferably added at a weight ratio of the preceding step amount to the succeeding step amount of from 10/90 to 90/10. When the deinking composition comprises one or both of the reaction product mixture (I) and the partial ester mixture (II) as the essential component, the weight ratio of additiion may be still more preferably from 40/60 to 60/40 (the preceding step to the succeeding step). When the deinking composition comprises the alkylene oxide adduct compound mixture (III) as the essential component, the weight ratio of addition may be still more preferably from 30/70 to 70/30 (the preceding step to the succeeding step).

Alternately, the deinking composition of the present invention may be added all at once or in portions during the succeeding step.

It is desirable to use the deinking composition of the present invention at such a ratio as to achieve an economic advantage without deteriorating the operating characteristics. It is recommended to add the deinking composition so as to achieve a deinking agent concentration of from 0.03 to 1.0% by weight based on the waste paper.

The deinking composition and the deinking method of the present invention are suitable for deinking waste office automation (OA) papers or blends containing waste OA papers. When the deinking composition comprises the alkylene oxide adduct compound mixture (III) as the essential component, the deinking composition and the deinking method of the present invention are still suitable for deinking waste OA papers or blends containing waste OA papers.

EXAMPLES

To further illustrate the present invention in detail, and not by way of limitation, the following Examples will be given.

PRODUCTION EXAMPLE 1

260.1 g of ethylene glycol and 4.7 g of 100% KOH were fed into a 1.5-l autoclave and heated to 150° C. under stirring at approximately 600 rpm. Next, 730.2 g of propylene oxide was added to the obtained mixture and reacted with ethylene glycol at a temperature of from 120° to 130° C. under a pressure of from 1 to 3 kg/cm$^2$ (gauge). After the completion of the addition reaction, the reaction mixture was cooled to 80° C. and the pH value was adjusted to about 6 with acetic acid. The yield of the obtained reaction product (used as a deinking agent in invention example No. 1 given in Table 1) was 99%.

PRODUCTION EXAMPLE 2

292.7 g of sorbitol and 2.7 g of 100% KOH were fed into a 1.5-l autoclave and heated to 150° C. under stirring at approximately 600 rpm. Next, 424.7 g of ethylene oxide was added to the obtained mixture and reacted with sorbitol at a temperature of from 150° to 160° C. under a pressure of from 1 to 3 kg/cm$^2$ (gauge). Then, 280.0 g of propylene oxide was added to the obtained mixture and was reacted at a temperature of from 120° to 130° C. under a pressure of from 1 to 3 kg/cm$^2$. After cooling to 80° C., the pH value of the reaction mixture was adjusted to about 6 with acetic acid. The yield of the obtained reaction product (used as a deinking agent in invention example No. 23 given in Table 2) was 99%.

COMPARATIVE PRODUCTION EXAMPLE 1

286.3 g of 2-hydroxycaproic acid and 3.4 g of 100% KOH were fed into a 1.5-l autoclave and heated to 130° C. under stirring at approximately 600 rpm. Next, 491.0 g of an ethylene oxide/propylene oxide/butylene oxide mixture (molar ratio: 20/40/20) was added to the obtained mixture and reacted with 2-hydroxycaproic acid at a temperature of from 130° to 140° C. under a pressure of from 1 to 3 kg/cm$^2$ (gauge). After the completion of the addition reaction, the reaction mixture was cooled to 80° C. and the pH value thereof was adjusted to about 6 with acetic acid. The yield of the obtained reaction product (used as a deinking agent in comparative example No. 30 given in Table 2) was 99%.

PRODUCTION EXAMPLE 3

229.1 g of glycerol and 4.2 g of 100% KOH were fed into a 1.5-l autoclave and heated to 130° C. under stirring at approximately 600 rpm. Next, 762.2 g of an ethylene oxide/propylene oxide mixture (molar ratio: 50/50) was added to the obtained mixture and reacted with glycerol at a temperature of from 130° to 140° C. under a pressure of from 1 to 3 kg/cm$^2$ (gauge). After the completion of the addition reaction, the reaction mixture was cooled to 80° C. and the pH value thereof was adjusted to about 6 with acetic acid. The yield of the obtained reaction product (used as a deinking agent in invention example No. 71 given in Table 4) was 99%.

PRODUCTION EXAMPLE 4

804.2 g of the product obtained in the Production Example 1, 194.5 g of 2-ethylhexanoic acid and 1.2 g of 100% NaOH, employed as a catalyst, were fed into a 1.5-l autoclave and allowed to react at 230° C. under a nitrogen atmosphere while stirring at approximately 500 rpm. The yield of the obtained reaction product (used as a deinking agent in invention example No. 73 given in Table 4) was 99%.

EXAMPLE 1

In this Example, a deinking agent was added at once in the pulping step.

Waste PPC papers (100%), printed with 2.4 g/m$^2$ of a printing ink comprising a styrene/acrylic binder, were cut into pieces (2×5 cm). A given amount thereof was fed into a bench disintegrator. Then, water, 0.5 wt. % (based on waste PPC papers) of caustic soda, 1.0 wt. % (based on waste PPC papers) of sodium silicate No. 3, 1.0 wt. % (based on waste PPC papers) of 30 wt. % hydrogen peroxide and 0.2 wt. % (based on waste PPC papers) of each deinking agent listed in Table 1 were added thereto. After disintegrating at a pulp concentration of 5 wt. % at 45° C. for 20 minutes, the mixture was aged at 45° C. for 60 minutes. Next, the mixture was dehydrated on a high-speed dehydrator until the pulp concentration reached 22 wt. % and then kneaded on a twin-screw laboratory kneader at 200 rpm. After diluting with water so as to give a pulp concentration of 4 wt. %, it was disintegrated again on the bench disintegrator for 30 seconds. The obtained slurry was concentrated on an 80-mesh wire gauze so as to give a pulp concentration of 10 wt. % and then diluted with water so as to give a pulp concentration of 1 wt. %. Subsequently, it was treated on a TAPPI standard sheet machine to thereby give a pulp sheet.

The whiteness of the obtained pulp sheet was measured with a color difference meter and the unliberated ink spots having a particle size of 30 μm or more were counted with an image analyzer (magnification: ×100). The defoaming property of the flotation reject was determined for use as an indicator of foaming troubles in the effluent disposal step. A larger numerical value of the defoaming property means a higher possibility of causing foaming troubles in the effluent disposal step. The defoaming property of the flotation reject as used herein is defined as follows:

$$\text{defoaming property of flotation reject} = \frac{\text{foam volume (ml) after 30 sec}}{\text{foam volume (ml) immediately after}} \times 100 \, (\%)$$

Table 1 shows the results of the evaluation of the deinking performances of the deinking agents.

TABLE 1

| | Deinking agent | | | | Whiteness (%) | No. of unliberated ink spots (≧30 μm) | Defoaming property (%) |
|---|---|---|---|---|---|---|---|
| No. | polyfunctional alcohol | AO*1 | added AO mole no.*2 | solubility parameter | | | |
| Invention Example | | | | | | | |
| 1 | ethylene glycol | PO | 1.5 (3) | 9.7 | 89.4 | 9 | 20 |
| 2 | ethylene glycol | PO | 1 (2) | 10.2 | 88.3 | 15 | 25 |
| 3 | ethylene glycol | PO | 4 (8) | 8.9 | 88.4 | 15 | 26 |
| 4 | 1,4-butanediol | EO | 2 (4) | 9.9 | 88.1 | 16 | 28 |
| 5 | 1,4-butanediol | EO/PO (1/1) | 2 (4) | 9.6 | 88.4 | 15 | 25 |
| 6 | 1,4-butanediol | EO/BO (1/1) | 2 (4) | 9.4 | 88.4 | 14 | 22 |
| 7 | 1,4-butanediol | PO/BO (1/1) | 2 (4) | 9.2 | 88.2 | 16 | 25 |
| 8 | 1,6-hexanediol | EO/PO (2/1) | 3 (6) | 9.3 | 88.2 | 16 | 23 |
| 9 | glycerol | EO/PO (6/6) | 4 (12) | 9.0 | 88.5 | 14 | 30 |
| 10 | glycerol | EO/PO (2/1) | 1 (3) | 10.1 | 88.6 | 13 | 22 |
| 11 | 1,2,3-butanetriol | EO | 1 (3) | 10.2 | 88.2 | 16 | 20 |
| 12 | 1,2,3-butanetriol | PO | 1 (3) | 9.8 | 88.5 | 14 | 18 |
| 13 | 1,2,3-butanetriol | PO | 3 (9) | 8.9 | 88.1 | 20 | 28 |
| Comparative Example | | | | | | | |
| 14 | ethylene glycol | PO | 5 (10) | 8.8 | 86.3 | 30 | 65 |
| 15 | ethylene glycol | PO | 13 (26) | 8.5 | 86.3 | 32 | 78 |
| 16 | glycerol | EO/PO (2/1) | 5 (15) | 8.9 | 86.2 | 31 | 68 |
| 17 | glycerol | EO/PO (2/1) | 10 (30) | 8.7 | 86.2 | 31 | 92 |
| 18 | 1,20-eicosanediol | PO | 4 (8) | 9.1 | 85.0 | 42 | 48 |
| 19 | 1,20-eicosanediol | PO | 5 (4) | 9.0 | 85.2 | 40 | 55 |

TABLE 1-continued

| No. | polyfunctional alcohol | AO*[1] | added AO mole no.*[2] | solubility parameter | Whiteness (%) | No. of unliberated ink spots (≧30 μm) | Deforming property (%) |
|---|---|---|---|---|---|---|---|
| 20 | 2-methylpropane-1,2,3-triol | BO | 5 (15) | 8.3 | 85.3 | 38 | 50 |
| 21 | $CH_3-(CH_2)_3-O-(EO)_2-(CH_2)_3-CH_3$ | | | 9.6 | 86.2 | 30 | 76 |
| 22 | $CH_3-(CH_2)_5-O-(EO)_2-CH_3$ | | | 9.6 | 86.5 | 26 | 74 |

Note
*[1]AO: alkylene oxide (the same will apply hereinafter), added at random in all cases.
*[2]added AO mole no.: It means AO mole no. per functional group on average and each figure given in parentheses means total AO mole no. of one molecule of the product on average (the same will apply hereinafter).

EXAMPLE 2

In this Example, a deinking agent was added in portions in the pulping step and in the kneading step.

Waste PPC papers (100%), printed with 2.4 g/m² of a printing ink comprising a styrene/acrylic binder, were cut into pieces (2×5 cm). A given amount thereof was fed into a bench disintegrator. Then, water, 0.3 wt. % (based on waste PPC papers) of caustic soda and 0.1 wt. % (based on waste PPC papers) of each deinking agent listed in Table 2 were added thereto. After disintegrating at a pulp concentration of 5 wt. % at 45° C. for 20 minutes, the mixture was aged at 45° C. for 60 minutes. Next, the mixture was dehydrated on a high-speed dehydrator until the pulp concentration reached 22 wt. %, and then 0.2 wt. % (based on waste PPC papers) of caustic soda, 1.0 wt. % (based on waste PPC papers) of sodium silicate No. 3, 1.0 wt. % (based on waste PPC papers) of 30 wt. % hydrogen peroxide and 0.1 wt. % (based on waste PPC papers) of each deinking agent listed in the Table 2 were added thereto. Then the mixture was kneaded on a twin-screw laboratory kneader at 200 rpm. After diluting with water so as to give a pulp concentration of 4 wt. %, it was disintegrated again on the bench disintegrator for 30 seconds. The obtained slurry was diluted with water so as to give a pulp concentration of 1 wt. % and subjected to flotation at 30° C. for 10 minutes. Subsequently, it was concentrated on an 80-mesh wire gause until the pulp concentration reached 10 wt. % and diluted with water so as to give a concentration of 1 wt. %. Then it was treated on a TAPPI standard sheet machine to thereby give a pulp sheet.

The whiteness of the obtained pulp sheet was measured with a color difference meter and the unliberated ink spots having a particle size of 30 μm or more were counted with an image analyzer (magnification: ×100). The defoaming property of the flotation reject was determined for use as an indicator of foaming troubles in the effluent disposal step, similar to the Example 1. Table 2 shows the results of the evaluation of the deinking performances of the deinking agents.

TABLE 2

| No. | polyfunctional alcohol or polyfunctional fatty acid | AO | added AO mole no. 2 | solubility parameter | Whiteness (%) | No. of unliberated ink spots (≧30 μm) | Defoaming property (%) |
|---|---|---|---|---|---|---|---|
| Invention Example | | | | | | | |
| 23 | sorbitol | EO/PO (6/3) | 1.5 (9) | 9.6 | 90.1 | 8 | 18 |
| 24 | sorbitol | EO/PO (8/4) | 2 (12) | 9.4 | 90.2 | 7 | 20 |
| 25 | pentaerythritol | PO | 2 (8) | 9.5 | 90.1 | 8 | 22 |
| 26 | 2-decene-1,10-dicarboxylic acid | EO | 2 (4) | 9.4 | 90.1 | 8 | 21 |
| 27 | adipic acid | BO | 1 (2) | 9.3 | 89.9 | 10 | 15 |
| 28 | 1,2-cyclononanediol | EO | 2 (4) | 9.5 | 90.1 | 9 | 17 |
| 29 | 2,3-dihydroxyenanthic acid | EO | 2 (6) | 9.4 | 90.0 | 9 | 20 |
| Comparative Example | | | | | | | |
| 30 | 2-hydroxycapric acid | EO/PO/BO (2/4/2) | 4 (8) | 8.8 | 86.8 | 29 | 65 |
| 31 | sorbitol | EO/PO (20/10) | 5 (30) | 8.8 | 86.4 | 29 | 96 |
| 32 | sorbitol | PO | 4 (24) | 8.7 | 86.5 | 29 | 90 |
| 33 | sorbitol | PO | 5 (30) | 8.4 | 86.5 | 30 | 92 |
| 34 | cellobiose | PO | 5 (40) | 8.5 | 86.2 | 32 | 92 |
| 35 | cellobiose | PO | 4 (32) | 8.5 | 86.1 | 32 | 93 |
| 36 | cellobiose | PO | 2 (16) | 8.7 | 86.5 | 29 | 89 |
| 37 | 2,3-dihydroxyenanthic acid | EO | 5 (15) | 9.0 | 86.8 | 28 | 78 |
| 38 | 2,3-dihydroxyenanthic acid | EO | 9 (27) | 8.8 | 86.2 | 31 | 79 |
| 39 | stearic acid $(EO)_{15}(PO)_{10}$ | | | | 86.9 | 27 | 85 |
| 40 | lauric acid $(EO)_{25}$ | | | | 86.5 | 29 | 84 |
| 41 | ammonium oleate | | | | 85.2 | 33 | 45 |

TABLE 2-continued

| | Deinking agent | | | | White-ness (%) | No. of unliberated ink spots (≥30 μm) | Defoaming property (%) |
|---|---|---|---|---|---|---|---|
| No. | polyfunctional alcohol or polyfunctional fatty acid | AO | added AO mole no. 2 | solubility parameter | | | |
| 42 | $CH_3-(CH_2)_3-\underset{\underset{C_2H_5}{\mid}}{C}HCH_2-O-(EO)_3-(CH_2)_3-CH_3/C_9H_{19}-\langle\bigcirc\rangle-(EO)_{12}-H = 70/30$ (weight ratio) | | | | 86.8 | 26 | 86 |
| 43 | xylene | | | | 86.2 | 29 | 5 |

EXAMPLE 3

In this Example, a deinking agent was added in portions in the pulping step and in the dispersing step.

Waste PPC papers (100%), printed with 3.0 g/m² of a printing ink comprising a polyester binder, were cut into pieces (2×5 cm). A given amount thereof was fed into a bench disintegrator. Then, water, 0.3 (based on waste PPC papers) of caustic soda and 0.1 wt. % (based on waste PPC papers) of each deinking agent listed in Table 3 were added thereto. After disintegrating at a pulp concentration of 15 wt. % at 45° C. for 20 minutes, the mixture was aged at 55° C. for 120 minutes. Next, the mixture was dehydrated on a high-speed dehydrator until the pulp concentration reached 22 wt. %, and then 0.7 wt. % (based on waste PPC papers) of caustic soda, 1.0 wt. % (based on waste PPC papers) of sodium silicate No. 3, 1.5 wt. % (based on waste PPC papers) of 30 wt. % hydrogen peroxide and 0.1 wt. % (based on waste PPC papers) of each deinking agent listed in the Table 3 were added thereto. Then, the mixture was dispersed on a laboratory disperser at 300 rpm. After diluting with water so as to give a pulp concentration of 4 wt. %, it was disintegrated again on the bench disintegrator for 30 seconds. The obtained slurry was diluted with water so as to give a pulp concentration of 1 wt. % and subjected to flotation at 30° C. for 10 minutes. Subsequently, it was concentrated on an 80-mesh wire gause until the pulp concentration reached 10 wt. % and diluted with water so as to give a concentration of 1 wt. %. Then, it was treated on a TAPPI standard sheet machine to thereby give a pulp sheet.

The whiteness of the obtained pulp sheet was measured with a color difference meter and the unliberated ink spots having a particle size of 30 μm or more were counted with an image analyzer (magnification: ×100). The defoaming property of the flotation reject was determined for use as an indicator of foaming troubles in the effluent disposal step, similar to the Example 1. Table 4 shows the results of the evaluation of the deinking performances of the deinking agents.

TABLE 3

| | Deinking agent | | | | | |
|---|---|---|---|---|---|---|
| | | | | ester compound | | |
| No. | polyfunctional alcohol or polyfunctional fatty acid | AO | added AO mole no. | fatty acid | degree of esterification (mol %) | solubility parameter |
| Invention Example | | | | | | |
| 44 | ethylene glycol | PO | 1 (2) | propionic acid | 25 | 9.7 |
| 45 | ethylene glycol | PO | 1 (2) | acetic acid | 60 | 9.2 |
| 46 | 1,2,3-butanetriol | EO | 1 (3) | butyric acid | 20 | 9.8 |
| 47 | 1,2,3-butanetriol | EO | 1 (3) | α-methylbutyric acid | 50 | 9.2 |
| 48 | 1,2,3-butanetriol | EO | 1 (3) | 2-octenoic acid | 70 | 9.2 |
| 49 | mannitan | PO/EO (4/8) | 3 (12) | isovaleric acid | 15 | 8.9 |
| 50 | ethylene glycol | EO/PO (2/2) | 2 (4) | 2-ethylhexanoic acid | 20 | 9.4 |
| 51 | ethylene glycol | PO | 1 (2) | propionic acid | 12 | 9.9 |
| 52 | ethylene glycol | PO | 1 (2) | propionic acid | 80 | 9.0 |
| 53 | 1,2,3-butanetriol | EO | 1 (3) | butyric acid | 10 | 10.0 |
| 54 | 1,2,3-butanetriol | EO | 1 (3) | butyric acid | 78 | 9.0 |
| Comparative Example | | | | | | |
| 55 | ethylene glycol | PO | 1 (2) | lauric acid | 25 | 9.6 |
| 56 | ethylene glycol | PO | 13 (26) | lauric acid | 25 | 8.5 |
| 57 | sorbitol | EO | 2 (12) | lauric acid | 25 | 9.1 |
| 58 | sorbitol | EO | 2 (12) | acetic acid | 80 | 8.6 |
| 59 | cellobiose | PO | 2 (16) | 2-ethylhexanoic acid | 40 | 8.6 |
| 60 | stachyose | EO | 1 (14) | lauric acid | 25 | 8.8 |
| 61 | stachyose | EO | 1 (14) | acetic acid | 25 | 8.6 |
| 62 | stachyose | EO | 1 (14) | acetic acid | 75 | 8.2 |
| 63 | stachyose | EO | 1 (14) | acetic acid | 15 | 8.7 |
| 64 | ethylene glycol | EO/PO (2/2) | 5 (10) | 2-ethylhexanoic acid | 20 | 8.9 |

TABLE 3-continued

| | Deinking agent | | | ester compound | | |
|---|---|---|---|---|---|---|
| No. | polyfunctional alcohol or polyfunctional fatty acid | AO | added AO mole no. | fatty acid | degree of esterification (mol %) | solubility parameter |
| 65 | ethylene glycol | EO/PO (2/2) | 13 (26) | 2-ethylhexanoic acid | 20 | 8.6 |
| 66 | ethylmalonic acid | PO | 1 (2) | 2-bromocaprylic acid | 15 | 8.8 |
| 67 | oleyl alcohol (EO)$_{12}$(PO)$_5$ | | | | | |
| 68 | ammonium oleate | | | | | |
| 69 | sodium dodecylbenzenesulfonate | | | | | |

TABLE 4

| No. | Whiteness (%) | No. of unliberated ink spots (≧30 μm) | Defoaming property (%) |
|---|---|---|---|
| Invention Example | | | |
| 44 | 88.4 | 15 | 20 |
| 45 | 89.8 | 8 | 15 |
| 46 | 88.2 | 16 | 18 |
| 47 | 89.9 | 10 | 22 |
| 48 | 89.9 | 9 | 18 |
| 49 | 88.1 | 18 | 25 |
| 50 | 89.9 | 8 | 22 |
| 51 | 87.8 | 21 | 29 |
| 52 | 86.9 | 24 | 35 |
| 53 | 86.3 | 24 | 41 |
| 54 | 86.4 | 20 | 40 |
| Comparative Example | | | |
| 55 | 86.9 | 39 | 52 |
| 56 | 86.2 | 31 | 95 |
| 57 | 86.3 | 30 | 86 |
| 58 | 86.3 | 32 | 84 |
| 59 | 86.2 | 32 | 72 |
| 60 | 86.3 | 30 | 88 |
| 61 | 86.1 | 32 | 85 |
| 62 | 86.0 | 36 | 82 |
| 63 | 86.2 | 32 | 90 |
| 64 | 86.8 | 29 | 85 |
| 65 | 86.8 | 29 | 92 |
| 66 | 86.9 | 29 | 50 |
| 67 | 86.4 | 32 | 53 |
| 68 | 85.4 | 44 | 40 |
| 69 | 85.5 | 46 | 95 |

EXAMPLE 4

In this Example, a deinking agent was added in portions in the pulping step and in the kneading step.

Waste PPC papers (100%), printed with 3.2 g/m$^2$ of a printing ink comprising a styrene/acrylic binder, were cut into pieces (2×5 cm). A given amount thereof was fed into a bench disintegrator. Then water, 0.3 wt. % (based on waste PPC papers) of caustic soda and a given amount of each deinking agent listed in Table 5 were added thereto. After disintegrating at a pulp concentration of 5 wt. % at 45° C. for 20 minutes, the mixture was aged at 45° C. for 60 minutes. Next, the mixture was dehydrated on a high-speed dehydrator until the pulp concentration reached 22 wt. % and then 0.2 wt. % (based on waste PPC papers) of caustic soda, 1.0 wt. % (based on waste PPC papers) of sodium silicate No. 3, 1.0 wt. % (based on waste PPC papers) of 30 wt. % hydrogen peroxide and a given amount of each deinking agent listed in Table 5 were added thereto. Then the mixture was kneaded on a twin-screw laboratory kneader at 200 rpm. After diluting with water so as to give a pulp concentration of 4 wt. %, it was disintegrated again on the bench disintegrator for 30 seconds. The obtained slurry was diluted with water so as to give a pulp concentration of 1 wt. % and subjected to flotation at 30° C. for 10 minutes. Subsequently, it was concentrated on an 80-mesh wire gauze until the pulp concentration reached 10 wt. % and diluted with water so as to give a concentration of 1 wt. %. Then it was treated on a TAPPI standard sheet machine to thereby give a pulp sheet.

The whiteness of the obtained pulp sheet was measured with a color difference meter and the unliberated ink spots having a particle size of 30 μm or more were counted with an image analyzer (magnification: ×100). The defoaming property of the flotation reject was determined for use as an indicator of foaming troubles in effluent disposal step, similar to the Example 1. Table 6 shows the results of the evaluation of the deinking performances of the deinking agents.

TABLE 5

| No. | Deinking agent polyfunctional alcohol or polyfunctional fatty acid | AO | added AO mole no. | ester compound fatty acid | degree of esterification (mol %) | solubility parameter | Added deinking agent (based on waste PPC papers; % by weight) pulping step (I) | kneading step (II) | weight ratio I/II |
|---|---|---|---|---|---|---|---|---|---|
| Invention Example | | | | | | | | | |
| 70 | 2-hydroxyvaleric acid | PO | 1 (2) | — | — | 9.6 | 0.02 | 0.18 | 10/90 |
| 71 | glycerol | EO/PO (3/3) | 2 (6) | — | — | 9.4 | 0.2 | 0.2 | 50/50 |
| 72 | ethylmalonic acid | PO | 1 (2) | — | — | 9.4 | 0.18 | 0.02 | 90/10 |
| 73 | ethylene glycol | PO | 1.5 (3) | 2-ethylhexanoic acid | 20 | 9.4 | 0.15 | 0.10 | 60/40 |
| 74 | sorbitol | EO/PO (6/3) | 1.5 (9) | propionic acid | 60 | 8.9 | 0.03 | 0.17 | 15/85 |
| Comparative Example | | | | | | | | | |
| 75 | glycerol | EO/PO (10/5) | 5 (15) | — | — | 8.9 | 0.2 | 0.2 | 50/50 |
| 76 | sorbitol | EO/PO (20/10) | 5 (30) | acetic acid | 25 | 8.7 | 0.03 | 0.17 | 15/85 |

TABLE 6

| No. | Whiteness (%) | No. of unliberated ink spots (≧30 μm) | Defoaming property (%) |
|---|---|---|---|
| Invention Example | | | |
| 70 | 90.2 | 6 | 20 |
| 71 | 91.2 | 4 | 12 |
| 72 | 90.3 | 6 | 15 |
| 73 | 90.5 | 5 | 20 |
| 74 | 90.2 | 6 | 28 |
| Comparative Example | | | |
| 75 | 86.0 | 28 | 75 |
| 76 | 85.8 | 32 | 80 |

As described above, the deinking agents according to the present invention, i.e., the deinking compositions of the present invention in the above-described cases, each of which is a reaction product mixture which is obtained by adding 1 to 4 mol per functional group of an alkylene oxide to a polyfunctional alcohol or a polyfunctional fatty acid having 1 to 10 carbon atoms, provided that the total addition mole number of the alkylene oxide does not exceed 22 mol, and has a solubility parameter of from 8.9 to 10.2, exert excellent effects, including elevating the whiteness, reducing the number of unliberated large ink spots and improving the defoaming property of the flotation reject, when they are used in deinking waste OA papers or blends containing waste OA papers.

Further, the deinking agents according to the present invention, i.e., the deinking compositions of the present invention in the above-described cases, each of which is a partial ester mixtures which is obtained by partially esterifying the aforesaid reaction product mixture with a fatty acid having 2 to 8 carbon atoms and has a solubility parameter of from 8.9 to 9.8, can exert similar effects to those described above, when they are used in deinking waste OA papers or blends containing waste OA papers.

Furthermore, a deinked pulp having more excellent qualities can be obtained by adding the deinking agent according to the present invention in portions, i.e., in the pulping step and in any of the subsequent steps.

PRODUCTION EXAMPLE 5

774.8 g of 2-ethylhexyl alcohol and 1.6 g of 100% KOH were fed into a 1.5-l autoclave and heated to 150° C. under stirring at approximately 600 rpm. Then, 251.9 g of ethylene oxide was added to the obtained mixture and reacted with 2-ethylhexyl alcohol at a temperature of from 150° to 160° C. under a pressure of from 1 to 3 kg/cm² (gauge). After the completion of the addition reaction, the reaction mixture was cooled to 80° C. and the pH value thereof was adjusted to 6 with acetic acid. The yield of the obtained reaction product (used as a deinking agent in invention example No. 77 given in Table 7) was 99%.

PRODUCTION EXAMPLE 6

262.9 g of propionic acid and 6.0 g of 100% KOH were fed into a 1.5-l autoclave and heated to 150° C. under stirring at approximately 600 rpm. Then, 724.8 g of an ethylene oxide/propylene oxide mixture (molar ratio: 50/50) was added to the obtained mixture and reacted with propionic acid at a temperature of from 150° to 160° C. under a pressure of from 1 to 3 kg/cm²(gauge). After the completion of the addition reaction, the reaction mixture was cooled to 80° C. and the pH value thereof was adjusted to 6 with acetic acid. The yield of the obtained reaction product (used as a deinking agent in invention example No. 92 given in Table 8) was 99%.

PRODUCTION EXAMPLE 7

194.2 g of propyl alcohol and 3.6 g of 100% KOH were fed into a 1.5-l autoclave and heated to 150° C. under stirring at approximately 600 rpm. Then, 426.9 g of ethylene oxide was added to the obtained mixture and reacted with propyl alcohol at a temperature of from 150° to 160° C. under a pressure of from 1 to 3 kg/cm² (gauge). After the completion of the reaction, 375.3 g of propylene oxide was added to the obtained mixture and reacted at a temperature of from 120° to 130° C. under a pressure of from 1 to 3 kg/cm². Then, the reaction mixture was cooled to 80° C., the pH value thereof was adjusted to 6 with acetic acid. The yield of the obtained reaction product (used as a deinking agent in invention example No. 106 given in Table 9) was 99%.

PRODUCTION EXAMPLE 8

239.5 g of butyric acid and 4.6 g of 100% NaOH were fed into a 1.5-l autoclave and heated to 150° C. under stirring at approximately 600 rpm. Then, 560.0 g of an ethylene oxide/propylene oxide/butylene oxide mixture (molar ratio: 40/40/20) was added to the obtained mixture and reacted with butyric acid at a temperature of from 150° to 160° C. under a pressure of from 1 to 3 kg/cm² (gauge). After the completion of the addition reaction, the reaction mixture was cooled to 80° C. and the pH value thereof was adjusted to 6 with acetic acid. The yield of the obtained reaction product (used as a deinking agent in invention example No. 114 given in Table 10) was 99%.

EXAMPLE 5

In this Example, a deinking agent was added at once in the pulping step.

Waste PPC papers (100%), printed with 2.4 g/m² of a printing ink comprising a styrene/acrylic binder, were cut into pieces (2×5 cm). A given amount thereof was fed into a bench disintegrator. Then, water. 0.5 wt. % (based on waste PPC papers) of caustic soda, 1.0 wt. % (based on waste PPC papers) of sodium silicate No. 3, 1.0 wt. % (based on waste PPC papers) of 30 wt. % hydrogen peroxide and 0.2 wt. % (based on waste PPC papers) of each deinking agent listed in Table 7 were added thereto. After disintegrating at a pulp concentration of 5 wt. % at 45° C. for 20 minutes, the mixture was aged at 45° C. for 60 minutes. Next, the mixture was dehydrated on a high-speed dehydrator until the pulp concentration reached 22 wt. % and then kneaded on a twin-screw laboratory kneader at 200 rpm. After diluting with water so as to give a pulp concentration of 4 wt. %, it was disintegrated again on the bench disintegrator for 30 seconds. The obtained slurry was concentrated on an 80-mesh wire gauze until the pulp concentration reached 10 wt. % and diluted with water so as to give a pulp concentration of 1 wt. %. Subsequently, it was treated on a TAPPI standard sheet machine to thereby give a pulp sheet.

The whiteness of the obtained pulp sheet was measured with a color difference meter and the unliberated ink spots having a particle size of 30 μm or more were counted with an image analyzer (magnification: ×100). The defoaming property of the flotation reject was determined for use as an indicator of foaming troubles in effluent disposal step, similar to the Example 1.

Table 7 shows the results of the evaluation of the deinking performances of the deinking agents.

TABLE 7

| No. | R | average C number in R | AO | m | solubility parameter | Whiteness (%) | No. of unliberated ink spots (≧30 μm) | Defoaming property (%) |
|---|---|---|---|---|---|---|---|---|
| Invention Example | | | | | | | | |
| 77 | CH₃(CH₂)₃CHCH₂— \| C₂H₅ | 8 | EO | 1 | 10.2 | 88.8 | 12 | 26 |
| 78 | CH₃(CH₂)₃CHCH₂— \| C₂H₅ | 8 | EO | 6 | 9.3 | 88.1 | 15 | 24 |
| 79 | CH₃— | 1 | EO | 1 | 11.7 | 88.2 | 16 | 23 |
| 80 | CH₃— | 1 | EO | 6 | 9.4 | 88.3 | 15 | 23 |
| 81 | CH₃CH— \| CH₃ | 3 | PO | 1 | 10.4 | 89.0 | 12 | 25 |
| 82 | CH₃—C— ‖ O | 2 | EO/PO (1/1) | 2 | 9.7 | 88.7 | 14 | 27 |
| 83 | CH₃—C— ‖ O | 2 | EO/PO (1/1) | 5 | 9.1 | 88.0 | 18 | 26 |
| 84 | CH₃—⟨O⟩— | 7 | PO/BO (1/1) | 2 | 9.4 | 88.0 | 19 | 43 |
| Comparative Example | | | | | | | | |
| 85 | CH₃(CH₂)₃CHCH₂— \| C₂H₅ | 8 | EO | 0.4 | 10.5 | 86.5 | 32 | 40 |

TABLE 7-continued

| No. | R | average C number in R | AO | m | solubility parameter | Whiteness (%) | No. of unliberated ink spots (≧30 μm) | Defoaming property (%) |
|---|---|---|---|---|---|---|---|---|
| 86 | $CH_3(CH_2)_3CHCH_2-$<br>\|<br>$C_2H_5$ | 8 | EO | 7 | 9.2 | 86.3 | 30 | 64 |
| 87 | $CH_3(CH_2)_8-$ | 9 | EO | 1 | 10.3 | 86.4 | 31 | 74 |
| 88 | $CH_3(CH_2)_8-$ | 9 | EO | 6 | 9.4 | 86.5 | 32 | 82 |
| 89 | $CH_3(CH_2)_8-$ | 9 | EO | 7 | 9.3 | 86.3 | 35 | 86 |
| 90 | $CH_3-(CH_2)_3-O-(EO)_2-(CH_2)_3-CH_3$ | | | | 9.6 | 86.2 | 30 | 76 |
| 91 | $CH_3-(CH_2)_5-O-(EO)_2-CH_3$ | | | | 9.6 | 86.5 | 26 | 74 |

EXAMPLE 6

In this Example, a deinking agent was added in portions in the pulping step and in the kneading step.

Waste PPC papers (100%), printed with 2.4 g/m² of a printing ink comprising a styrene/acrylic binder, were cut into pieces (2×5 cm). A given amount thereof was fed into a bench disintegrator. Then, water, 0.3 wt. % (based on waste PPC papers) of caustic soda and 0.1 wt. % (based on waste PPC papers) of each deinking agent listed in Table 8 were added thereto. After disintegrating at a pulp concentration of 5 wt. % at 45° C. for 20 minutes, the mixture was aged at 45° C. for 60 minutes. Next, the mixture was dehydrated on a high-speed dehydrator until the pulp concentration reached 22 wt. % and then 0.2 wt. % (based on waste PPC papers) of caustic soda, 1.0 wt. % (based on waste PPC papers) of sodium silicate No. 3, 1.0 wt. % (based on waste PPC papers) of 30 wt. % hydrogen peroxide and 0.1 wt. % (based on waste PPC papers) of each deinking agent listed in the Table 8 were added thereto, followed by kneading on a twin-screw laboratory kneader at 200 rpm. After diluting with water so as to give a pulp concentration of 4 wt. %, it was disintegrated again on the bench disintegrator for 30 seconds. The obtained slurry was diluted with water to give a pulp concentration of 1 wt. %, and then subjected to flotation at 30° C. for 10 minutes. Next, the pulp slurry was concentrated on an 80-mesh wire gauze until the pulp concentration reached 10 wt. % and diluted with water so as to give the pulp concentration of 1 wt. %. Subsequently, it was treated on a TAPPI standard sheet machine to thereby give a pulp sheet.

The whiteness of the obtained pulp sheet was measured with a color difference meter and the unliberated ink spots having a particle size of 30 μm or more were counted with an image analyzer (magnification: ×100). The defoaming property of the flotation reject was determined, by method of the Example 1, for use as an indicator of foaming troubles in the effluent disposal step. Table 8 shows the deinking performances of various deinking agents.

TABLE 8

| No. | R | average C number in R | AO | m | solubility parameter | Whiteness (%) | No. of unliberated ink spots (≧30 μm) | Defoaming property (%) |
|---|---|---|---|---|---|---|---|---|
| Invention Example | | | | | | | | |
| 92 | $CH_3CH_2C-$<br>\|\|<br>$O$ | 3 | EO/PO (2/2) | 4 | 9.2 | 89.0 | 10 | 22 |
| 93 | $CH_3CH_2C-$<br>\|\|<br>$O$ | 3 | EO/PO (2/2) | 1 | 10.1 | 90.3 | 8 | 24 |
| 94 | $CH_3CH_2C-$<br>\|\|<br>$O$ | 3 | EO/PO (2/2) | 6 | 9.0 | 89.0 | 10 | 24 |
| 95 | $CH_3CH-$<br>\|<br>$CH_3$ | 3 | PO | 1 | 10.4 | 90.2 | 7 | 21 |
| 96 | $CH_3(CH_2)_2CH=CHCH_2-$ | 6 | PO | 1 | 10.3 | 90.1 | 8 | 28 |
| 97 | $CH_3(CH_2)_2CH=CHCH_2-$ | 6 | EO/BO (1/1) | 2 | 9.7 | 89.4 | 9 | 22 |
| 98 Comparative | $CH_2=CH(CH_2)_5-$ | 7 | EO/PO (3/3) | 6 | 9.1 | 89.0 | 10 | 25 |

TABLE 8-continued

| No. | R | average C number in R | AO | m | solubility parameter | Whiteness (%) | No. of unliberated ink spots (≧30 μm) | Defoaming property (%) |
|---|---|---|---|---|---|---|---|---|
| Example | | | | | | | | |
| 99 | CH$_3$CH$_2$C(=O)— | 3 | EO/PO (4/4) | 8 | 8.9 | 86.2 | 25 | 45 |
| 100 | CH$_3$CH$_2$C(=O)— | 3 | PO | 0.5 | 10.1 | 86.4 | 28 | 45 |
| 101 | CH$_3$(CH$_2$)$_7$C(=O)— | 9 | EO/PO (2/2) | 4 | 9.3 | 86.3 | 24 | 72 |
| 102 | CH$_3$(CH$_2$)$_{16}$C(=O)— | 18 | EO/PO (2/2) | 4 | 9.3 | 86.4 | 25 | 87 |
| 103 | CH$_3$(CH$_2$)$_{16}$C(=O)— | 18 | EO/PO (20/20) | 40 | 8.6 | 86.5 | 24 | 88 |
| 104 | CH$_3$—(CH$_2$)$_3$—CH(C$_2$H$_5$)CH$_2$—O—(EO)$_3$—(CH$_2$)$_3$—CH$_3$/C$_9$H$_{19}$—⟨O⟩—(EO)$_{12}$—H = 70/30 (weight ratio) | | | | | 86.8 | 26 | 86 |
| 105 | xylene | | | | | 86.2 | 29 | 5 |

EXAMPLE 7

In this Example, a deinking agent was added at once in the pulping step.

Waste CPO papers (100%), printed with 3.0 g/m² of a printing ink comprising a polyester binder, were cut into pieces (2×5 cm). A given amount thereof was fed into a bench disintegrator. Then, water, 1.0 (based on waste CPO papers) of caustic soda, 1.0 (based on waste CPO papers) of sodium silicate No. 3, 1.5 wt. % (based on waste CPO papers) of 30 wt. % hydrogen peroxide and 0.2 wt. % (based on waste CPO papers) of each deinking agent listed in Table 9 were added thereto. After disintegrating at a pulp concentration of 15 wt. % at 45° C. for 20 minutes, the mixture was aged at 55° C. for 120 minutes. Next, the mixture was dehydrated on a high-speed dehydrator until the pulp concentration reached 22 wt. % and then dispersed on a laboratory disperser at 300 rpm. After diluting with water so as to give a pulp concentration of 4 wt. %, it was disintegrated again on the bench disintegrator for 30 seconds. The obtained slurry was diluted with water to give a pulp concentration of 1 wt. % and subjected to flotation at 30° C. for 10 minutes. Then, the slurry was concentrated on an 80-mesh wire gauze until the pulp concentration reached 10 wt. % and diluted with water so as to give the pulp concentration of 1 wt. %. Subsequently, it was treated on a TAPPI standard sheet machine to thereby give a pulp sheet.

The whiteness of the obtained pulp sheet was measured with a color difference meter and the unliberated ink spots having a particle size of 30 μm or more were counted with an image analyzer (magnification: ×100). The defoaming property of the flotation reject was determined, using the same method as in Example 1, for use as an indicator of foaming troubles in the effluent disposal step. Table 9 shows the deinking performances of various deinking agents.

TABLE 9

| No. | R | average C number in R | AO | m | solubility parameter | Whiteness (%) | No. of unliberated ink spots (≧30 μm) | Defoaming property (%) |
|---|---|---|---|---|---|---|---|---|
| Invention Example | | | | | | | | |
| 106 | CH$_3$(CH$_2$)$_2$— | 3 | EO/PO (3/2) | 5 | 9.3 | 87.4 | 15 | 29 |
| 107 | CH$_3$(CH$_2$)$_2$—/CH$_3$— (50/50) | 2 | PO | 1 | 10.1 | 88.3 | 16 | 24 |
| 108 Comparative Example | CH$_3$(CH$_2$)$_2$— | 3 | EO/PO (2/4) | 6 | 9.1 | 88.1 | 14 | 25 |

TABLE 9-continued

| | Deinking agent RO(AO)$_m$H | | | | | | No. of unliberated | Defoaming |
|---|---|---|---|---|---|---|---|---|
| No. | R | average C number in R | AO | m | solubility parameter | Whiteness (%) | ink spots (≧30 μm) | property (%) |
| 109 | CH$_3$(CH$_2$)$_{17}$—/CH$_3$— (40/60) | 7.2 | PO | 0.9 | 10.2 | 86.2 | 30 | 45 |
| 110 | CH$_3$(CH$_2$)$_{17}$—/CH$_3$— (40/60) | 7.2 | PO | 12 | 8.7 | 87.0 | 32 | 85 |
| 111 | CH$_3$(CH$_2$)$_{17}$—/CH$_3$— (40/60) | 7.2 | EO/PO (20/10) | 30 | 8.7 | 86.5 | 31 | 88 |
| 112 | ammonium oleate | | | | | 85.4 | 44 | 40 |
| 113 | sodium dodecylbenzenesulfonate | | | | | 85.5 | 46 | 95 |

EXAMPLE 8

In this Example, a deinking agent was added in portions in the pulping step and in the dispersing step.

Waste CPO papers (100%), printed with 3.0 g/m² of a printing ink comprising a polyester binder, were cut into pieces (2×5 cm). A given amount thereof was fed into a bench disintegrator. Then, water, 0.3 wt. % (based on waste CPO papers) of caustic soda and 0.1 wt. % (based on waste CPO papers) of each deinking agent listed in Table 10 were added thereto. After disintegrating at a pulp concentration of 15 wt. % at 45° C. for 20 minutes, the mixture was aged at 55° C. for 120 minutes. Next, the mixture was dehydrated on a high-speed dehydrator until the pulp concentration reached 22 wt. %, and then 0.7 wt. % (based on waste CPO papers) of caustic soda, 1.0 wt. % (based on waste CPO papers) of sodium silicate No. 3, 1.5 wt. % (based on waste CPO papers) of 30 wt. % hydrogen peroxide and 0.1 wt. % (based on waste CPO papers) of each deinking agent listed in the Table 10 were added thereto, followed by dispersing on a laboratory disperser at 300 rpm. After diluting with water so as to give a pulp concentration of 4 wt. %, it was disintegrated again on the bench disintegrator for 30 seconds. The obtained slurry was diluted with water to give a pulp concentration of 1 wt. % and then subjected to flotation at 30° C. for 10 minutes. Next, the pulp slurry was concentrated on an 80-mesh wire gauze until the pulp concentration reached 10 wt. % and diluted with water so as to give the pulp concentration of 1 wt. %. Subsequently, it was treated on a TAPPI standard sheet machine to thereby give a pulp sheet.

The whiteness of the obtained pulp sheet was measured with a color difference meter and the unliberated ink spots having a particle size of 30 μm or more were counted with an image analyzer (magnification: ×100). The defoaming property of the flotation reject was determined, as in Example 1, for use as an indicator of foaming troubles in the effluent disposal step. Table 10 shows the deinking performances of various deinking agents.

TABLE 10

| | Deinking agent RO(AO)$_m$H | | | | | | No. of unliberated | Defoaming |
|---|---|---|---|---|---|---|---|---|
| No. | R | average C number in R | AO | m | solubility parameter | Whiteness (%) | ink spots (≧30 μm) | property (%) |
| Invention Example | | | | | | | | |
| 114 | CH$_3$(CH$_2$)$_2$C(=O)— | 4 | EO/PO/BO (2/2/1) | 5 | 9.0 | 89.3 | 9 | 24 |
| 115 | CH$_3$(CH$_2$)$_2$C(=O)— | 4 | EO/PO (2/3) | 5 | 9.1 | 89.4 | 9 | 25 |
| 116 | CH$_3$(CH$_2$)$_2$C(=O)— | 4 | EO | 5 | 9.3 | 89.3 | 8 | 25 |
| 117 | CH$_3$(CH$_2$)$_2$C(=O)— | 4 | PO | 5 | 9.0 | 89.2 | 9 | 22 |
| 118 | CH$_3$(CH$_2$)$_2$— | 3 | EO/PO (2/4) | 6 | 9.1 | 90.5 | 7 | 18 |
| 119 | CH$_2$=CH(CH$_2$)$_5$— | 7 | PO | 5 | 9.4 | 89.1 | 9 | 20 |
| 120 | CH$_3$CH$_2$— | 2 | PO | 1 | 10.8 | 90.6 | 5 | 15 |
| 121 | CH$_3$(CH$_2$)$_4$— | 5 | PO | 1 | 10.4 | 90.7 | 4 | 17 |
| 122 | CH$_3$CH$_2$— | 2 | BO | 1 | 10.3 | 90.6 | 4 | 18 |
| 123 | CH$_3$(CH$_2$)$_4$— | 5 | BO | 1 | 10.0 | 90.6 | 4 | 15 |

TABLE 10-continued

| | | Deinking agent RO(AO)$_m$H | | | | Whiteness (%) | No. of unliberated ink spots (≧30 μm) | Defoaming property (%) |
|---|---|---|---|---|---|---|---|---|
| No. | R | average C number in R | AO | m | solubility parameter | | | |
| Comparative Example | | | | | | | | |
| 124 | CH$_3$(CH$_2$)$_2$C(=O)— | 4 | BO | 5 | 8.6 | 86.9 | 34 | 65 |
| 125 | CH$_3$(CH$_2$)$_2$C(=O)— | 4 | EO/PO/BO (4/4/2) | 10 | 8.7 | 87.0 | 32 | 65 |
| 126 | CH$_3$(CH$_2$)$_2$C(=O)— | 4 | EO | 0.6 | 10.2 | 86.9 | 28 | 74 |
| 127 | CH$_3$(CH$_2$)$_2$C(=O)— | 10 | EO/PO/BO (2/2/2) | 6 | 8.9 | 87.2 | 35 | 72 |

EXAMPLE 9

In this Example, a deinking agent was added in portions in the pulping step and in the kneading step.

Waste PPC papers (100%), printed with 3.2 g/m² of a printing ink comprising a styrene/acrylic binder, were cut into pieces (2×5 cm). A given amount thereof was fed into a bench disintegrator. Then, water, 0.3 wt. % (based on waste PPC papers) of caustic soda and a given amount of each deinking agent listed in Table 11 were added thereto. After disintegrating at a pulp concentration of 5 wt. % at 45° C. for 20 minutes, the mixture was aged at 45° C. for 60 minutes. Next, the mixture was dehydrated on a high-speed dehydrator until the pulp concentration reached 22 wt. %, and then 0.2 wt. % (based on waste PPC papers) of caustic soda, 1.0 wt. % (based on waste PPC papers) of sodium silicate No. 3, 1.0 wt. % (based on waste PPC papers) of 30 wt. % hydrogen peroxide and a given amount of each deinking agent listed in Table 11 were added thereto, followed by kneading on a twin-screw laboratory kneader at 200 rpm. After diluting with water so as to give a pulp concentration of 4 wt. %, it was disintegrated again on the bench disintegrator for 30 seconds. The obtained slurry was diluted with water to give a pulp concentration of 1 wt. % and then subjected to flotation at 30° C. for 10 minutes. Next, the pulp slurry was concentrated on an 80-mesh wire gauze until the pulp concentration reached 10 wt. % and diluted with water so as to give the pulp concentration of 1 wt. %. Subsequently, it was treated on a TAPPI standard sheet machine to thereby give a pulp sheet.

The whiteness of the obtained pulp sheet was measured with a color difference meter and the unliberated ink spots having a particle size of 30 μm or more were counted with an image analyzer (magnification: ×100). The defoaming property of the flotation reject was determined, as in Example 1, for use as an indicator of foaming troubles in the effluent disposal step. Table 12 shows the deinking performances of various deinking agents.

TABLE 11

| | Deinking agent RO(AO)$_m$H | | | | | Addition of deinking agent (based on waste PPC papers) | | |
|---|---|---|---|---|---|---|---|---|
| No. | R | average C number in R | AO | m | solubility parameter | pulping step (I) | kneading step (II) | I/II wt. ratio |
| Invention Example | | | | | | | | |
| 128 | CH$_3$(CH$_2$)$_3$CHCH$_2$—<br>\|<br>C$_2$H$_5$ | 8 | EO | 1 | 10.2 | 0.1 | 0.1 | 50/50 |
| 129 | CH$_3$(CH$_2$)$_3$CHCH$_2$—<br>\|<br>C$_2$H$_5$ | 8 | EO | 1 | 10.2 | 0.18 | 0.02 | 90/10 |
| 130 | CH$_3$(CH$_2$)$_3$CHCH$_2$—<br>\|<br>C$_2$H$_5$ | 8 | EO | 1 | 10.2 | 0.02 | 0.18 | 10/90 |

TABLE 11-continued

| | Deinking agent | | | | | Addition of deinking agent (based on waste PPC papers) | | |
|---|---|---|---|---|---|---|---|---|
| | RO(AO)$_m$H | | | | | pulping | kneading | |
| No. | R | average C number in R | AO | m | solubility parameter | step (I) | step (II) | I/II wt. ratio |
| 131 | CH$_3$C(=O)— | 2 | EO/PO (1/1) | 2 | 9.7 | 0.12 | 0.08 | 60/40 |
| 132 | CH$_3$C(=O)— | 2 | EO/PO (1/1) | 2 | 9.7 | 0.17 | 0.03 | 85/15 |
| 133 | CH$_3$C(=O)— | 2 | EO/PO (1/1) | 2 | 9.7 | 0.03 | 0.17 | 15/85 |
| 134 | CH$_3$(CH$_2$)$_2$— | 3 | EO/PO (3/2) | 5 | 9.3 | 0.2 | 0.3 | 40/60 |
| 135 | CH$_3$(CH$_2$)$_2$— | 3 | EO/PO (3/2) | 5 | 9.3 | 0.4 | 0.1 | 80/20 |
| 136 | CH$_3$(CH$_2$)$_2$— | 3 | EO/PO (3/2) | 5 | 9.3 | 0.1 | 0.4 | 20/80 |
| 137 | CH$_3$(CH$_2$)$_3$CH(C$_2$H$_5$)CH$_2$— | 8 | EO | 1 | 10.2 | 0.184 | 0.016 | 92/8 |
| 138 | CH$_3$(CH$_2$)$_3$CH(C$_2$H$_5$)CH$_2$— | 8 | EO | 1 | 10.2 | 0.016 | 0.184 | 8/92 |
| 139 | CH$_3$C(=O)— | 2 | EO/PO (1/1) | 2 | 9.7 | 0.182 | 0.018 | 91/9 |
| 140 | CH$_3$C(=O)— | 2 | EO/PO (1/1) | 2 | 9.7 | 0.018 | 0.182 | 9/91 |
| 141 | CH$_3$(CH$_2$)$_2$— | 3 | EO/PO (3/2) | 5 | 9.3 | 0.186 | 0.014 | 93/7 |
| 142 Comparative Example | CH$_3$(CH$_2$)$_2$— | 3 | EO/PO (3/2) | 5 | 9.3 | 0.014 | 0.186 | 7/93 |
| 143 | CH$_3$(CH$_2$)$_{16}$C(=O)— | 18 | EO/PO (15/10) | 25 | 8.7 | 0.1 | 0.1 | 50/50 |
| 144 | CH$_3$(CH$_2$)$_{17}$— | 18 | EO | 8 | 9.3 | 0.2 | 0.3 | 40/60 |

TABLE 12

| No. | Whiteness (%) | No. of unliberated ink spots (≧30 μm) | Defoaming property (%) |
|---|---|---|---|
| Invention Example | | | |
| 128 | 91.2 | 3 | 10 |
| 129 | 90.4 | 5 | 15 |
| 130 | 90.2 | 5 | 15 |
| 131 | 89.8 | 7 | 20 |
| 132 | 89.5 | 8 | 22 |
| 133 | 89.4 | 8 | 24 |
| 134 | 89.8 | 7 | 22 |
| 135 | 89.4 | 8 | 25 |
| 136 | 89.2 | 9 | 24 |
| 137 | 89.0 | 11 | 24 |
| 138 | 89.1 | 10 | 22 |
| 139 | 89.2 | 11 | 18 |
| 140 | 89.2 | 11 | 18 |
| 141 | 89.0 | 12 | 15 |
| 142 | 88.9 | 13 | 17 |
| Comp. Example | | | |
| 143 | 86.4 | 25 | 92 |
| 144 | 86.2 | 27 | 90 |

As described above, the deinking agents according to the present invention, i.e., the deinking compositions of the present invention in the above-described cases, each of which is an alkylene oxide adduct compound mixture which comprises or essentially consists compounds represented by the general formula (1) and has a solubility parameter of from 9.0 to 11.8, exert excellent effects in elevating the whiteness, reducing the number of unliberated large ink spots and improving the defoaming property of the flotation reject, when they are used in deinking waste OA papers or blends containing waste OA papers.

Further, a deinked pulp having more excellent qualities can be obtained by adding the deinking agent according to the present invention in portions, i.e., in the pulping step and in any of the subsequent steps.

The invention being thus described, it will be obvious that the same may be varied in many ways. Such variations are not to be regarded as a departure from the spirit and a scope of the invention, and all such modifications as would be obvious to one skilled in the art are intended to be included within the scope of the following claims.

What we claim:

1. A method for deinking waste paper, comprising:
   (I) pulping the waste paper,
   (II) subjecting the pulp to at least one treatment step selected from the group consisting of kneading, dispersing, chemical mixing and refining, and
   (III) subjecting the treated pulp to a flotation or washing step,
   wherein a deinking composition comprising water and a deinking agent selected from the group consisting of:
   (i) a reaction product having a solubility parameter of 8.9 to 10.2, which is obtained from the addition reaction of an alkylene oxide to a polyfunctional alcohol having 1 to 10 carbon atoms, wherein 1 to 4 moles of alkylene oxide units are added per 1 mole of functional group, provided that the total addition of alkylene oxide does not exceed 22 moles per 1 mole of polyfunctional alcohol;
   (ii) a reaction product having a solubility parameter of 8.9 to 10.2, which is obtained from the addition reaction of an alkylene oxide to a polyfunctional fatty acid having 1 to 10 carbon atoms, wherein 1 to 4 moles of alkylene oxide units are added per 1 mole of functional group, provided that the total addition of alkylene oxide does not exceed 22 moles per 1 mole of polyfunctional fatty acid; and
   (iii) a partial ester mixture having a solubility parameter of 8.9 to 9.8 and a degree of esterification of 15 to 75% by mole, which is formed by reacting the reaction product of (ii) with a fatty acid having 2 to 8 carbon atoms is added during steps (I) and, (II) and/or (III).

2. The method for deinking waste paper according to claim 1, wherein the ratio of the deinking composition added in step (I) to steps (II) and/or (III) is 10/90 to 90/10 by weight.

3. The method for deinking waste paper according to claim 1, wherein the waste paper is waste office automation (OA) papers or blends containing thereof.

4. The method for deinking waste paper according to claim 3, wherein the deinking composition comprises a deinking agent of the alkylene oxide adduct compound mixture (III).

5. The method according to claim 1, wherein said deinking agent is (IV).

6. The method according to claim 5, wherein said deinking agent is an ethylene oxide adduct of 2-ethylhexanol.

7. The method according to claim 1, wherein the deinking agent is added in an amount of 0.03 to 1.0 wt. %, based on the weight of the deinking composition.

8. A method for deinking waste paper, comprising:
   (I) pulping the waste paper,
   (II) subjecting the pulp to at least one treatment step selected from the group consisting of kneading, dispersing, chemical mixing and refining, and
   (III) subjecting the treated pulp to a flotation or washing step,
   wherein a deinking composition comprising water and a deinking agent selected from the group consisting of:
   (i) a reaction product having a solubility parameter of 8.9 to 10.2, which is obtained from the addition reaction of an alkylene oxide to a polyfunctional alcohol having 1 to 10 carbon atoms, wherein 1 to 4 moles of alkylene oxide units are added per 1 mole of functional group, provided that the total addition of alkylene oxide does not exceed 22 moles per 1 mole of polyfunctional alcohol;
   (ii) a reaction product having a solubility parameter of 8.9 to 10.2, which is obtained from the addition reaction of an alkylene oxide to a polyfunctional fatty acid having 1 to 10 carbon atoms, wherein 1 to 4 moles of alkylene oxide units are added per 1 mole of functional group, provided that the total addition of alkylene oxide does not exceed 22 moles per 1 mole of polyfunctional fatty acid; and
   (iii) a partial ester mixture having a solubility parameter of 8.9 to 9.8 and a degree of esterification of 15 to 75% by mole, which is formed by reacting the reaction product of (ii) with a fatty acid having 2 to 8 carbon atoms is added during steps (I) and (II).

9. The method according to claim 8, wherein said deinking agent is (IV).

10. The method according to claim 9, wherein said deinking agent is an ethylene oxide adduct of 2-ethylhexanol.

11. The method according to claim 8, wherein the deinking agent is added in an amount of 0.03 to 1.0 wt. %, based on the weight of the deinking composition.

* * * * *